United States Patent
Hamada

(10) Patent No.: US 9,170,871 B2
(45) Date of Patent: Oct. 27, 2015

(54) DATA POLLING METHOD AND DIGITAL INSTRUMENTATION AND CONTROL SYSTEM FOR ATOMIC POWER PLANT USING THE METHOD

(71) Applicant: Mitsubishi Electric Corporation, Chiyoda-ku (JP)

(72) Inventor: Kazuhide Hamada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 333 days.

(21) Appl. No.: 13/661,278

(22) Filed: Oct. 26, 2012

(65) Prior Publication Data

US 2013/0339791 A1 Dec. 19, 2013

(30) Foreign Application Priority Data

Jun. 13, 2012 (JP) ................................ 2012-133382

(51) Int. Cl.
*G06F 11/07* (2006.01)
*G06F 3/06* (2006.01)

(52) U.S. Cl.
CPC .......... *G06F 11/0757* (2013.01); *G06F 3/0656* (2013.01); *G06F 11/0724* (2013.01)

(58) Field of Classification Search
CPC ............ G06F 11/0751; G06F 11/0781; G06F 3/0655; G06F 3/0656; G06F 3/0659; G06F 3/0602
USPC .......................................................... 714/55
See application file for complete search history.

(56) References Cited

U.S. PATENT DOCUMENTS

| | | | | |
|---|---|---|---|---|
| 6,728,806 | B2* | 4/2004 | Kakiage | 710/65 |
| 6,791,998 | B1* | 9/2004 | Yoshihara et al. | 370/449 |
| 6,948,113 | B1* | 9/2005 | Shaver | 714/769 |
| 6,983,324 | B1* | 1/2006 | Block et al. | 709/228 |

FOREIGN PATENT DOCUMENTS

JP          2003-259469 A     9/2003

* cited by examiner

*Primary Examiner* — Joseph Schell
(74) *Attorney, Agent, or Firm* — Buchanan Ingersoll & Rooney PC

(57) ABSTRACT

The CPU includes: a data transmission instruction output processor; a failure detection signal input processor to which a failure detection signal is input from a failure detection processor for detecting a failure of an input unit; a data storage memory for, each time an input data update processor of the input unit updates data, storing the updated data; and a CPU operation processor for obtaining input data from the data storage memory and obtaining a detection signal from the failure detection signal input processor to perform operation processing. The CPU operation processor obtains periodic data as of an amount of time given by the following expression ago:

$$\{\text{ROUNDUP}(T_{22}/T_1)\} \times T_1$$

where $T_{22}$ is the failure detection processing time of the failure detection processor, $T_1$ is the data transmission instruction output period of the data transmission instruction output processor, and ROUNDUP is a function of rounding up to the nearest integer.

2 Claims, 4 Drawing Sheets

DATA POLLING METHOD AND DIGITAL INSTRUMENTATION AND CONTROL SYSTEM FOR ATOMIC POWER PLANT USING THE METHOD

BACKGROUND OF THE INVENTION

1. Field of the Invention

The present invention relates to a data polling method and a digital instrumentation and control system for atomic power plant using the method.

2. Description of the Related Art

A digital control system for atomic power plant needs to be reliable, so it needs to be a system in which, when a failure occurs, its cause can be accurately determined. So, in the system, the reliability of input data input from the outside, such as pres sure of pressurizer, temperature of heater or auxiliary machine open/close status, is determined by appending to the input data its associated reliability data, such as for determining whether the input data is normal or abnormal.

In order to determine the reliability of input data, data polling is performed between a central processing unit (CPU) equipped in a digital controller system for atomic power plant and an input module as an input unit for input data. Then, reliability data is appended to the input data and the CPU outputs determination data.

However, in a conventional digital controller system for atomic power plant, the data polling period of the equipped CPU is not synchronized with the data update period of the input module, and also, an input module failure detection time for the input module to detect a failure is long relative to the data polling period of the CPU.

Thus, the data polling period of the CPU may be changed to retrieve data from the input module. For example, though in a different technical field, JP-A-2003-259469 (Patent Document 1) discloses a wide area management system for water utility in which a polling period is changed for periodic data collection, self-check or the like.

[Patent Document 1] JP-A-2003-259469 (in paragraph 0032)

However, the Patent Document 1 only discloses that a polling period is changed for periodic data collection, self-check or the like, but does not disclose a specific method for changing the polling period.

SUMMARY OF THE INVENTION

In order to solve the above problem, it is an object of the present invention to provide a data polling method suitable for a digital instrumentation and control system for atomic power plant and provide a digital instrumentation and control system for atomic power plant using the method.

An aspect of the invention provides a data polling method performed between a CPU and an input unit for input data for the CPU. The CPU includes: a data transmission instruction output processor; an input unit failure detection signal input processor to which a failure detection signal is input from a input unit failure detection processor for detecting a failure of the input unit; an input data storage memory for, each time an input data update processor of the input unit updates data, storing the updated data; and a CPU operation processor for obtaining input data from the input data storage memory and obtaining a detection signal from the input unit failure detection signal input processor to perform operation processing. The CPU operation processor obtains periodic data as of an amount of time given by the following expression ago:

$$\{\text{ROUNDUP}(T_{22}/T_1)\} \times T_1$$

where $T_{22}$ is the failure detection processing time of the input unit failure detection processor, $T_1$ is the data transmission instruction output period of the data transmission instruction output processor, and ROUNDUP is a function of rounding up to the nearest integer.

Another aspect of the invention provides a digital instrumentation and control system for atomic power plant that performs data polling between a CPU and an input unit for input data for the CPU. The CPU includes: a data transmission instruction output processor; an input unit failure detection signal input processor to which a failure detection signal is input from a input unit failure detection processor for detecting a failure of the input unit; an input data storage memory for, each time an input data update processor of the input unit updates data, storing the updated data; and a CPU operation processor for obtaining input data from the input data storage memory and obtaining a detection signal from the input unit failure detection signal input processor to perform operation processing. The CPU operation processor obtains periodic data as of an amount of time given by the following expression ago:

$$\{\text{ROUNDUP}(T_{22}/T_1)\} \times T_1$$

where $T_{22}$ is the failure detection processing time of the input unit failure detection processor, $T_1$ is the data transmission instruction output period of the data transmission instruction output processor, and ROUNDUP is a function of rounding up to the nearest integer.

According to the data polling method in accordance with the invention, even when the data polling period of the CPU is not synchronized with the data update period of the input module, and the input module failure detection time for the input module to detect a failure is long relative to the data polling period of the CPU, the CPU can output reliable determination data.

Furthermore, according to the digital instrumentation and control system for atomic power plant in accordance with the another aspect of the invention, a reliable digital instrumentation and control system can be provided.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Preferred embodiments of a data polling method and a digital instrumentation and control system for atomic power plant using the method in accordance with the invention are described below with reference to the drawings.

First Embodiment

Figure 1:
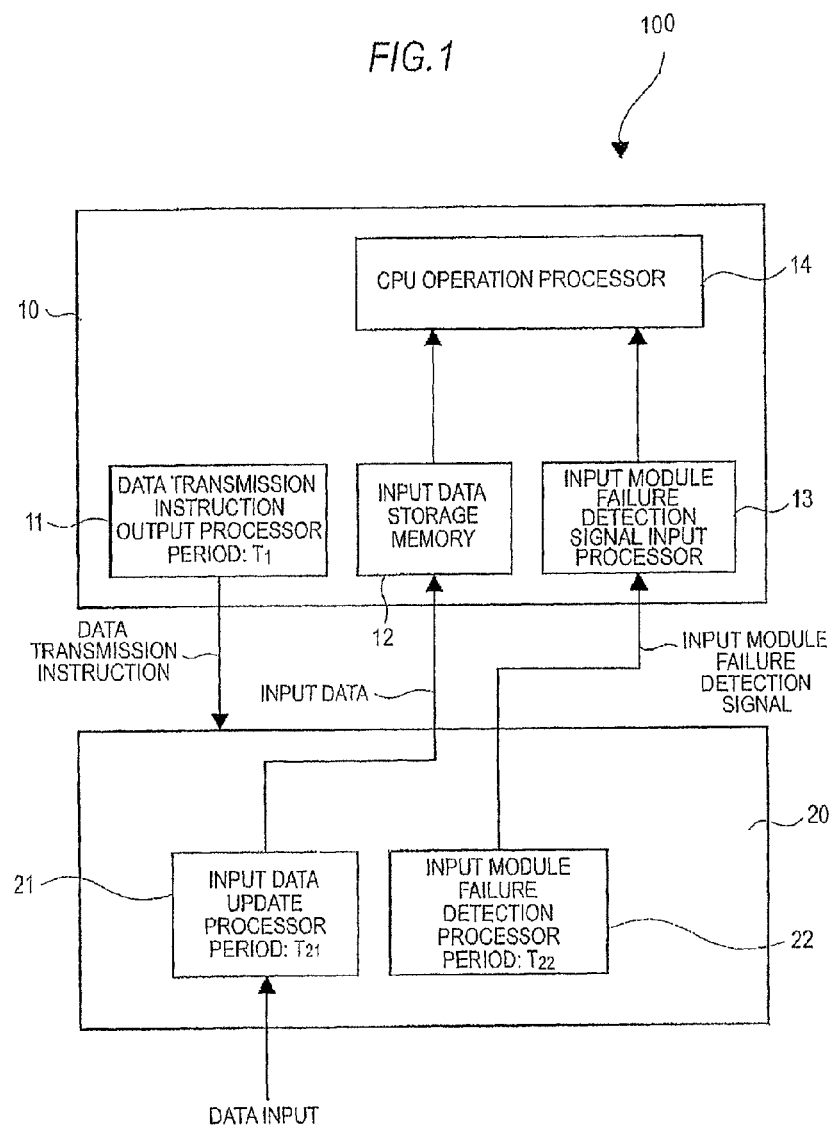
FIG. 1 is a block configuration diagram illustrating a digital instrumentation and control system for atomic power plant in accordance with a first embodiment of the invention.

FIG. 1 is a block configuration diagram illustrating a digital instrumentation and control system for atomic power plant using a data polling method in accordance with a first embodiment of the invention.

In FIG. 1, a data input processor 100 of the digital instrumentation and control system for atomic power plant includes a CPU 10 and a data input unit for the CPU 10, e.g., an input module 20.

The CPU 10 includes: a data transmission instruction output processor 11 for outputting a data transmission instruction to the input module 20 with a predetermined period of T1; an input data storage memory 12 for storing input data from the input module 20; an input module failure detection signal input processor 13 to which a failure detection signal is input from the input module 20; and a CPU operation processor 14 for obtaining input data from the input data storage memory 12 and obtaining a detection signal from the input module failure detection signal input processor 13 to perform operation processing.

The input module 20 includes: an input data update processor 21 for updating input data with a predetermined period of $T_{21}$; and an input module failure detection processor for detecting a failure of the input module 20 in a predetermined processing time of $T_{22}$. The input data storage memory 12 is configured to, each time the input data update processor 21 updates data, store the updated data. Furthermore, there is a relationship of $T_1 < T_{22}$ between the period of $T_1$ for the data transmission instruction output processor 11 and the predetermined processing time of $T_{22}$ for the input module failure detection processor 22.

In the above configuration, the CPU 10 outputs a data transmission instruction from the data transmission instruction output processor 11 to the input module 20, stores input data from the input data update processor 21 of the input. module 20 to the input data storage memory 12, and inputs an input module failure detection signal from the input module failure detection processor 22 to the input module failure detection signal input processor 13. Then, the CPU operation processor 14 obtains respective data from the input data storage memory 12 and the input module failure detection signal input processor 13, performs operation processing and outputs its result. The output from the CPU operation processor 14 is not shown in FIG. 1.

The data input processor 100 of the digital instrumentation and control system for atomic power plant in accordance with the first embodiment is configured as described above. Next, how the data input processor 100 works is described below.

Figure 2:
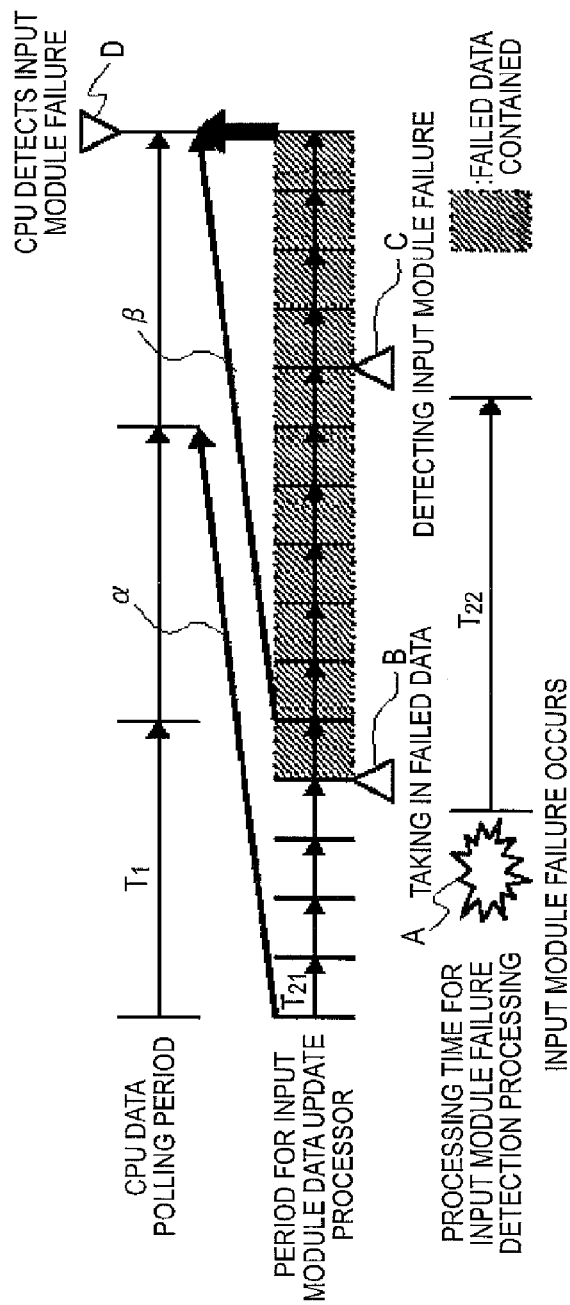
FIG. 2 is a diagram illustrating an operation of the digital instrumentation and control system for atomic power plant in accordance with the first embodiment of the invention.

FIG. 2 is a conceptual timing diagram for the CPU 10 and the input module 20 in data polling performed by the CPU 10. As shown in FIG. 2, the CPU 10 outputs a data transmission instruction to the input module 20 with a predetermined period of $T_1$. On the other hand, the input module 20 updates input data with a predetermined period of $T_{21}$. Furthermore, the input module failure detection processor 22 detects a failure of the input module 20 in a predetermined processing time of $T_{22}$.

In FIG. 2, if a failure occurs in the input module 20 at a time point A, the input data update processor 21 takes in failed data when performing data update at a time point B, then repeatedly performs data update with the failed data contained. Then, the input module failure detection processor 22 detects the failure of the input module 20 at a time point C. Then, the CPU 10 detects the failure of the input module 20 at a time point D.

In the above, in the first embodiment, in obtaining input data from the input data storage memory 12 to the CPU operation processor 14, the CPU 10 obtains periodic data as of an amount of time given by the following expression ago:

$$\{\text{ROUNDUP}(T_{22}/T_1)\} \times T_1 \qquad \text{Expression 1}$$

where $T_{22}$ is the failure detection processing time of the input module failure detection processor 22, $T_1$ is the data transmission instruction output period of the data transmission instruction output processor 11, and ROUNDUP is a function of rounding up to the nearest integer.

Figure 3:
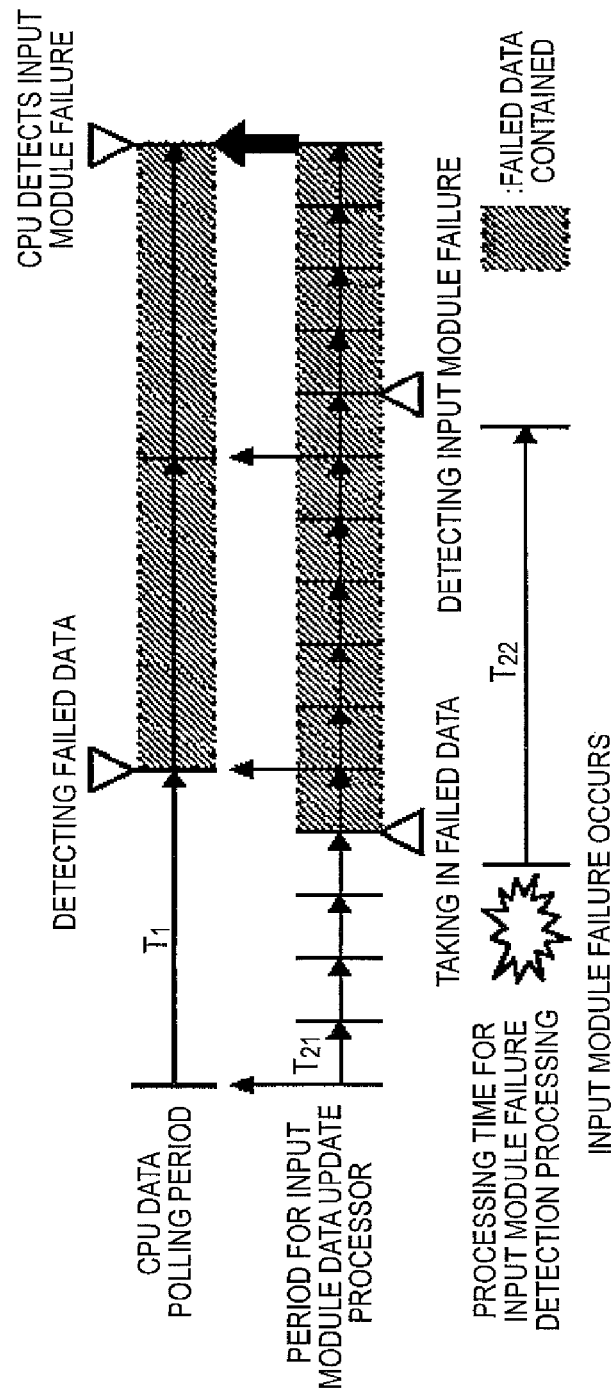
FIG. 3 is a diagram illustrating an operation of a conventional digital instrumentation and control system for atomic power plant.

By obtaining periodic data as of an amount of time given by the Expression 1 ago, the CPU 10 can obtain data from the input module failure detection processor 22 at the same time as, or before, obtaining data from the input data update processor 21 with the input module 20 in failed state. In FIG. 2, arrows α and β illustrates this data obtaining operation. On the other hand, FIG. 3 is a timing diagram of data polling performed by a conventional CPU shown by contrast with FIG. 2.

As described above, according to the first embodiment, even when the data polling period of the CPU is not synchronized with the data update period of the input module, and the input module failure detection time for the input module to detect a failure is long relative to the data polling period of the CPU, the CPU can output reliable determination data.

Second Embodiment

Figure 4:
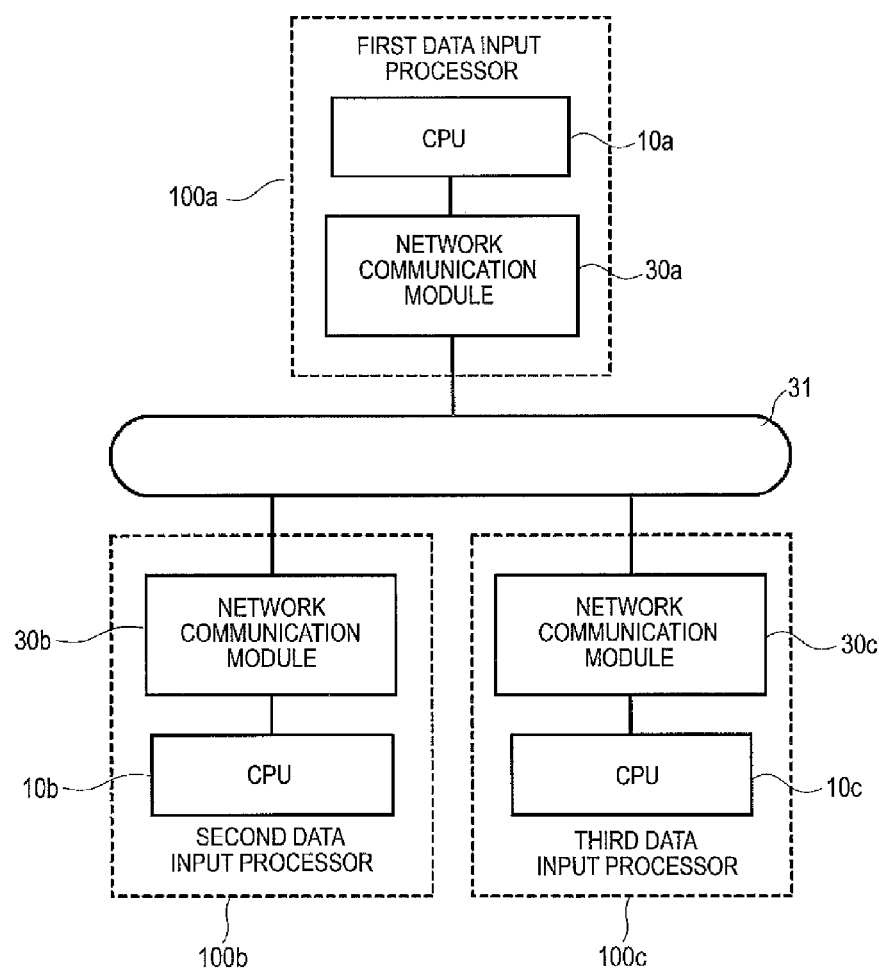
FIG. 4 is a block configuration diagram illustrating a digital instrumentation and control system for atomic power plant in accordance with a second embodiment of the invention.

Next, a digital instrumentation and control system for atomic power plant in accordance with a second embodiment of the invention is described. FIG. 4 is a block configuration diagram illustrating a digital instrumentation and control system for atomic power plant in accordance with the second embodiment.

In the first embodiment, the input module 20 directly processes input data input from the outside, such as pressure of pressurizer, temperature of heater or auxiliary machine open/close status of an atomic power plant. Furthermore, also in a digital controller for atomic power plant connected to another controller via a network as shown in FIG. 4, the similar effect can be obtained in processing communication data input from the another controller via a network communication module.

In FIG. 4, a data input processor 100a of a digital instrumentation and control system includes a CPU 10a and a network communication module 30a and is connected to a network 31. Also, the other data input processors 100b, 100c include CPUs 10b, 10c and network communication modules 30b, 30c, respectively, and are connected to the network 31. Note that the internal configuration of the CPUs 10a, 10b, 10c is similar to that of the CPU 10 of the first embodiment, and will not be repeatedly described in detail.

In the above configuration, an effect similar to that of the first embodiment can be obtained by performing data polling similar to that of the first embodiment among the CPUs 10a, 10b, 10c.

The first and second embodiments of the invention have been described, but the invention is not limited to those, and any combination of the embodiments and an appropriate variation or omission of the embodiments may be made within the scope of the invention.

Various modification and alterations of this invention will be apparent to those skilled in the art without departing from the scope and spirit of this invention, and it should be understood that this is not limited to the illustrative embodiment set forth herein.

What is claimed is:

1. A data polling method performed between a CPU and an input unit for input data for the CPU, wherein the CPU comprises a data transmission instruction output processor, an input unit failure detection signal input processor; an input data storage memory, and a CPU operation processor, and the method comprising:

inputting a failure detection signal, from an input failure detection processor for detecting failure of the input unit, into the input unit failure detection signal input processor;

each time an input data update processor of the input unit updates data, storing the updated data in the input data storage memory;

obtaining input data in the CPU operation processor from the input data storage memory and obtaining a detection signal from the input unit failure detection signal input processor to perform operation processing, and obtaining, by the CPU operation processor, periodic data over an amount of time given by the following expression:

$$\{ROUNDUP(T_{22}/T_1)\} \times T_1$$

where $T_{22}$ is a failure detection processing time of the input unit failure detection processor, $T_1$ is a data transmission instruction output period of the data transmission instruction output processor, and ROUNDUP is a function of rounding up to the nearest integer.

2. A digital instrumentation and control system for an atomic power plant that performs data polling between a CPU and an input unit for input data for the CPU, the digital instrumentation and control system comprising:

the CPU that comprises:

a data transmission instruction output processor, an input unit failure detection signal input processor to which a failure detection signal is input from a input unit failure detection processor for detecting a failure of the input unit, an input data storage memory that, each time an input data update processor of the input unit updates data, stores the updated data, and a CPU operation processor that obtains input data from the input data storage memory and obtains a detection signal from the input unit failure detection signal input processor to perform operation processing; and wherein the CPU operation processor obtains periodic data over an amount of time given by the following expression:

$$\{ROUNDUP(T_{22}/T_1)\} \times T_1$$

where $T_{22}$ is a failure detection processing time of the input unit failure detection processor, $T_1$ is a data transmission instruction output period of the data transmission instruction output processor, and ROUNDUP is a function of rounding up to the nearest integer.

\* \* \* \* \*